United States Patent
Hong et al.

(10) Patent No.: US 10,968,309 B2
(45) Date of Patent: Apr. 6, 2021

(54) POLYMERIZABLE COMPOSITION FOR A PLASTIC LENS

(71) Applicant: SKC CO., LTD., Gyeonggi-do (KR)

(72) Inventors: Seung Mo Hong, Incheon (KR); Jung Hwan Myung, Gyeonggi-do (KR); Junghwan Shin, Gyeonggi-do (KR)

(73) Assignee: SKC CO., LTD., Gyeonggi-do (KR)

(*) Notice: Subject to any disclaimer, the term of this patent is extended or adjusted under 35 U.S.C. 154(b) by 137 days.

(21) Appl. No.: 16/161,456

(22) Filed: Oct. 16, 2018

(65) Prior Publication Data

US 2019/0112414 A1   Apr. 18, 2019

(30) Foreign Application Priority Data

Oct. 18, 2017   (KR) .......................... 10-2017-0135274

(51) Int. Cl.
*C08G 18/77* (2006.01)
*G02B 1/04* (2006.01)
(Continued)

(52) U.S. Cl.
CPC ......... *C08G 18/775* (2013.01); *C08G 18/242* (2013.01); *C08G 18/3876* (2013.01); *C08K 5/107* (2013.01); *G02B 1/041* (2013.01)

(58) Field of Classification Search
CPC .................................................... G02B 1/041
See application file for complete search history.

(56) References Cited

U.S. PATENT DOCUMENTS 3,972,846 A * 8/1976 Mori .................... C08G 18/089
528/85
2011/0190466 A1* 8/2011 Hayashi ............... C08G 18/222
528/9

(Continued)

FOREIGN PATENT DOCUMENTS

CN   1271121 C   8/2006
EP   3357950     8/2018

(Continued)

OTHER PUBLICATIONS

Office Action issued by the Taiwanese Intellectual Property Office dated Apr. 12, 2019.

(Continued)

*Primary Examiner* — Michael F Pepitone
(74) *Attorney, Agent, or Firm* — IP & T Group LLP

(57) ABSTRACT

Embodiments relate to a polymerizable composition for a plastic lens. The polymerizable composition for a plastic lens according to the embodiment further comprises a diketone compound for the purpose of controlling the strong activity of a halogenated tin-based catalyst. Further, the polymerizable composition is preliminarily polymerized at a low temperature of 5 to 20° C. for a certain period of time, specifically 1 to 20 hours. Since it is possible to stabilize the reaction rate of the composition and to properly control the viscosity of the composition, a more stable pot life is attained, thereby improving the workability. In addition, the generation of bubbles is prevented, thereby improving the transparency of the resin. Hence, the polymerizable composition can be advantageously used for fabricating various plastic lenses such as eyeglass lenses, camera lenses, and the like.

7 Claims, 2 Drawing Sheets

(51) Int. Cl.
*C08G 18/24* (2006.01)
*C08G 18/38* (2006.01)
*C08K 5/07* (2006.01)
*C08K 5/107* (2006.01)

(56) References Cited

U.S. PATENT DOCUMENTS

| | | | |
|---|---|---|---|
| 2011/0215493 A1* | 9/2011 | Miura | B29D 11/0073 |
| | | | 264/1.32 |
| 2014/0107314 A1 | 4/2014 | Kawato et al. | |
| 2016/0017085 A1* | 1/2016 | Kawaguchi | C07C 381/00 |
| | | | 528/77 |

FOREIGN PATENT DOCUMENTS

| | | |
|---|---|---|
| JP | 3379120 | 2/2003 |
| JP | 2009169391 | 7/2009 |
| JP | 2015-069087 | 4/2015 |
| JP | 6095646 | 3/2017 |
| KR | 101207128 | 11/2012 |

OTHER PUBLICATIONS

Office Action issued by the Korean Intellectual Property Office dated Dec. 14, 2018.
Office Action issued by the Korean Intellectual Property Office dated Jun. 15, 2018.
Search Report issued by European Patent Office dated Jan. 16, 2019.

\* cited by examiner

POLYMERIZABLE COMPOSITION FOR A PLASTIC LENS

The present application claims priority of Korean patent application number 10-2017-0135274 filed on Oct. 18, 2017, which is incorporated herein by reference in its entirety.

TECHNICAL FIELD

Embodiments relate to a polymerizable composition for a plastic lens and a polythiourethane-based plastic lens prepared therefrom.

BACKGROUND ART

Plastic optical materials are lightweight, hardly breakable, and excellent in dyeability as compared with optical materials made of inorganic materials such as glass. Therefore, plastic materials of various resins are widely used as optical materials for eyeglass lenses, camera lenses, and the like. In recent years, there has been an increased demand for higher performance of optical materials, particularly in terms of high transparency, high refractive index, low specific gravity, high heat resistance, high impact resistance, and the like. A polythiourethane-based compound is widely used as an optical material by virtue of its excellent optical characteristics and excellent mechanical properties.

In general, a polythiourethane-based compound is prepared by a casting polymerization in which a polymerizable composition is injected into a mold and thermally cured. In such event, the polymerization reaction is carried out over several hours to tens of hours while the temperature is gradually elevated from a low temperature to a high temperature. Here, it is critical to secure a sufficient time for the casting—that is, a sufficient pot life—in order to improve the workability. In addition, in order to sufficiently materialize the resin properties, it is necessary to complete the polymerization. In order to complete the polymerization, for example, a catalyst having a strong polymerization activity may be used, or an increased amount of a catalyst may be used. In order to achieve stable polymerizability, it is important to secure a stable pot life even in different lots. If the pot life varies from lot to lot, polymerization deviations may occur, which may affect the quality stability of the resin.

Halogenated tin-based catalysts have been the most widely used since they meet the above-mentioned requirements. In addition to the above, a process in which an amine-based catalyst is employed is also known. For example, Korean Patent No. 1207128 discloses a process for polymerization in which an amine-based hydrochloride is employed as a catalyst.

PRIOR ART DOCUMENT

Patent Document (Patent Document 1) Korean Patent No. 1207128

DISCLOSURE OF THE INVENTION

Technical Problem

However, when the halogenated tin-based catalyst is used, it is difficult to properly control the reaction rate because the activity of the catalyst is so strong during the polymerization. A lens prepared using the amine-based catalyst as disclosed in Korean Patent No. 1207128 has a problem that it has a slight color. Thus, a blue dye should be mixed in a relatively large amount to deal with this problem, which results in a disadvantage that the total transmittance is reduced.

Accordingly, in an embodiment, a nonhalogenated tin-based catalyst is employed, along with a metal chelating agent of a diketone compound, and a polymerizable composition comprising them is preliminarily polymerized at a low temperature for a certain period of time. Since it is possible to properly control the reactivity of the halogenated catalyst and the reaction rate and viscosity of the composition, a polymerizable composition for a plastic lens having improved workability and high transparency, which is an advantage of a glass lens, and a polythiourethane-based plastic lens prepared therefrom can be provided.

Solution to the Problem

An embodiment provides a polymerizable composition for a plastic lens, which comprises a polyiso(thio)cyanate compound; a bi- or higher functional thiol compound having at least one sulfide bond or at least one ester bond; and a catalyst, and which satisfies the following Equation 1.

$$\Delta \ln Y = b \times \Delta X \quad \text{[Equation 1]}$$

In the above equation, $\Delta \ln Y$ is $\ln Y_X - \ln Y_0$, $Y_0$ is the initial viscosity (cps) of the polymerizable composition, $Y_X$ is the viscosity (cps) of the polymerizable composition at a temperature of 10° C. after X hour(s) elapse, $\Delta X$ is from 1 hour to 10 hours, and b is the slope of a graph derived from the value of $\Delta \ln Y$ measured with respect to X time and is 0.1 $\text{hour}^{-1}$ to 0.3 $\text{hour}^{-1}$.

In addition, an embodiment provides a process for preparing a polythiourethane-based plastic lens, which comprises providing a polymerizable composition, which comprises a polyiso(thio)cyanate compound, a bi- or higher functional thiol compound having at least one sulfide bond or at least one ester bond, and a catalyst; preliminarily polymerizing the composition at a temperature of 5° C. to 20° C.; and curing the preliminarily polymerized composition, wherein the preliminary polymerization is carried out such that it satisfies the above Equation 1.

Further, an embodiment provides a plastic lens prepared by curing a polymerizable composition for a plastic lens, which comprises a polyiso(thio)cyanate compound, a bi- or higher functional thiol compound having at least one sulfide bond or at least one ester bond, and a catalyst, and which satisfies the above Equation 1.

Advantageous Effects of the Invention

The polymerizable composition for a plastic lens according to the embodiment further comprises a diketone compound for the purpose of controlling the strong activity of a halogenated tin-based catalyst. The polymerizable composition is preliminarily polymerized at a low temperature of 5 to 20° C. for a certain period of time, specifically 1 to 20 hours. Since it is possible to stabilize the reaction rate of the composition and to properly control the viscosity of the composition, a more stable pot life is attained, thereby improving the workability. In addition, the generation of bubbles is prevented, thereby improving the transparency of the resin. Hence, the polymerizable composition can be advantageously used for fabricating various plastic lenses such as eyeglass lenses, camera lenses, and the like.

DETAILED DESCRIPTION FOR CARRYING OUT THE INVENTION

Figure 1:
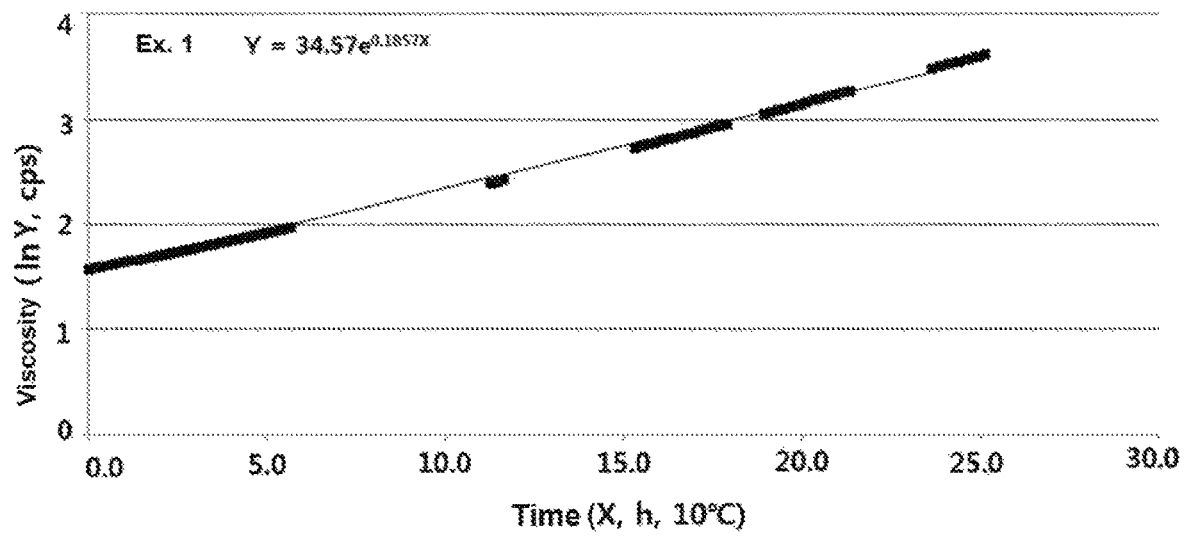
FIGS. 1 to 4 are graphs that show the changes in viscosity (Y) of the polymerizable compositions prepared in Examples 1 to 4 as measured at 10° C. with respect to time (X) using a non-contact viscometer, which are represented in a logarithmic scale.
Figure 2:
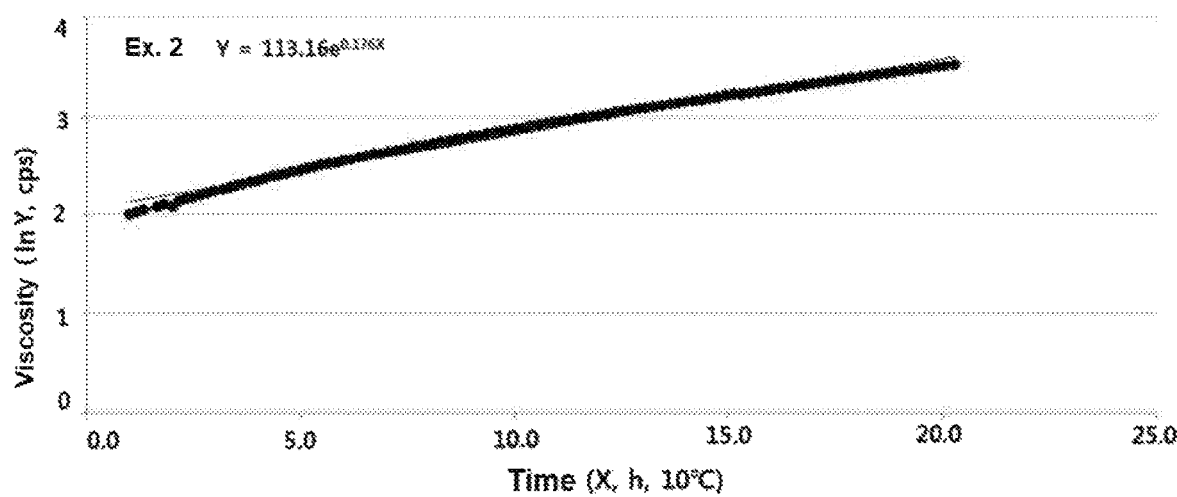
Figure 3:
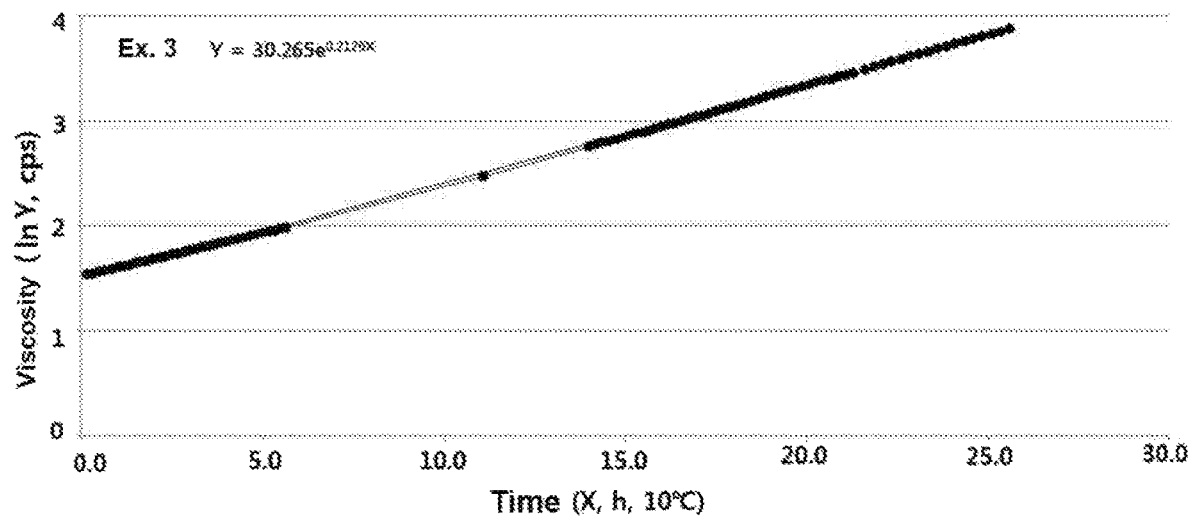
Figure 4:
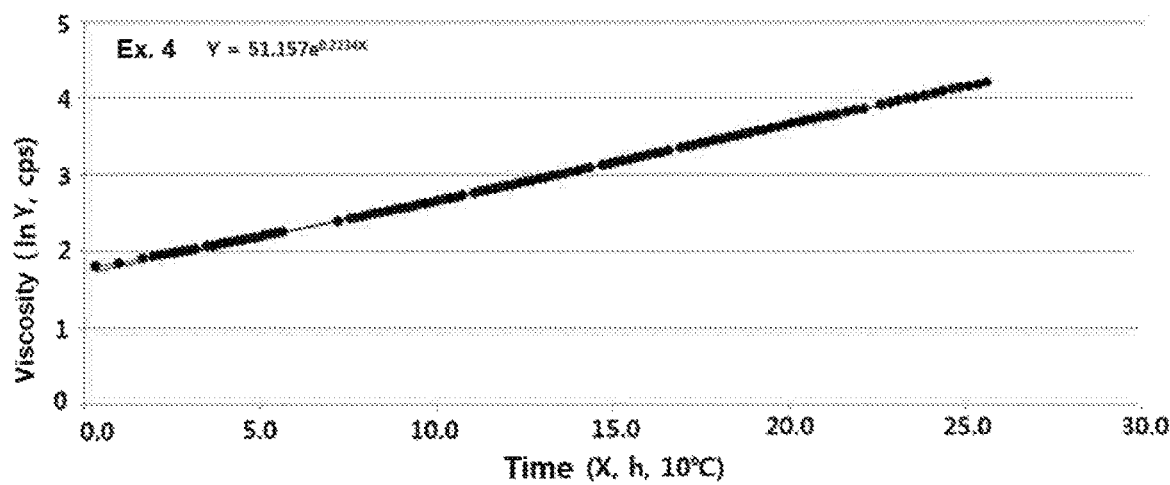

An embodiment provides a polymerizable composition, which comprises a polyiso(thio)cyanate compound; a bi- or higher functional thiol compound having at least one sulfide bond or at least one ester bond; and a catalyst, and which satisfies the following Equation 1.

$$\Delta \ln Y = b \times \Delta X \qquad \text{[Equation 1]}$$

In the above equation, $\Delta \ln Y$ is $\ln Y_X - \ln Y_0$, $Y_0$ is the initial viscosity (cps) of the polymerizable composition, $Y_X$ is the viscosity (cps) of the polymerizable composition at a temperature of 10° C. after X hour(s) elapse, $\Delta X$ is from 1 hour to 10 hours, and b is the slope of a graph derived from the value of $\Delta \ln Y$ measured with respect to X time and is 0.1 hour$^{-1}$ to 0.3 hour$^{-1}$.

Specifically, b is 0.1 hour$^{-1}$ to 0.3 hour$^{-1}$ or 0.15 hour$^{-1}$ to 0.25 hour. Within the above range, the polymerizable composition may have an initial viscosity of 20 to 100 cps or 30 to 80 cps at 10° C. after mixing thereof. Only when the polymerizable composition has a viscosity within the above range, the reactivity can be maintained during the polymerization, to thereby prevent the generation of bubbles and to prevent such uneven hardening as striae upon curing thereof.

The polyiso(thio)cyanate compound is not particularly limited as long as it is a compound having at least two iso(thio)cyanate groups in the molecule.

Specifically, examples of the polyiso(thio)cyanate compound may include an aliphatic polyisocyanate compound such as hexamethylene diisocyanate, 1,5-pentane diisocyanate, 2,2-dimethylpentane diisocyanate, 2,2,4-trimethylhexane diisocyanate, butene diisocyanate, 1,3-butadiene-1,4-diisocyanate, 2,4,4-trimethylhexamethylene diisocyanate, 1,6,11-undecane triisocyanate, 1,3,6-hexamethylene triisocyanate, 1,8-diisocyanato-4-isocyanatomethyloctane, bis(isocyanatoethyl) carbonate, bis(isocyanatoethyl) ether, lysine diisocyanato methyl ester, lysine triisocyanate, 1,2-diisothiocyanatoethane, 1,6-diisothiocyanatohexane, isophorone diisocyanate, bis(isocyanatomethyl)cyclohexane, dicyclohexylmethane diisocyanate, cyclohexane diisocyanate, methylcyclohexane diisocyanate, dicyclohexyldimethylmethane isocyanate, 2,5-bis(isocyanatomethyl)-bicyclo [2.2.1]heptane, 2,6-bis(isocyanatomethyl)-bicyclo [2.2.1] heptane, 3,8-bis(isocyanatomethyl)tricyclodecane, 3,9-bis(isocyanatomethyl)tricyclodecane, 4,8-bis(isocyanatomethyl)tricyclodecane, 4,9-bis(isocyanatomethyl)tricyclodecane, bis(4-isocyanatocyclohexyl)methane, 1,3-bis(isocyanatomethyl)cyclohexane, 1,4-bis(isocyanatomethyl)cyclohexane, and cyclohexane diisothiocyanate; an aromatic polyisocyanate compound such as 1,2-diisocyanatobenzene, 1,3-diisocyanatobenzene, 1,4-diisocyanatobenzene, tolylene diisocyanate, 2,4-diisocyanatotoluene, 2,6-diisocyanatotoluene, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, biphenyl diisocyanate, toluidine diisocyanate, 4,4'-methylene-bis(phenyl isocyanate), 4,4'-methylene-bis(2-methylphenyl isocyanate), dibenzyl-4,4'-diisocyanate, bis(isocyanatophenyl)ethylene, bis(isocyanatomethyl)benzene, m-xylene diisocyanate, bis(isocyanatomethyl cyclohexane), bis(isocyanatoethyl)benzene, bis(isocyanatopropyl)benzene, α,α,α',α'-tetramethyl xylylene diisocyanate, bis(isocyanatobutyl)benzene, bis(isocyanatomethyl)naphthalene, bis(isocyanatomethylphenyl) ether, bis(isocyanatoethyl)phthalate, 2,5-di(isocyanatomethyl)furan, 1,2-diisothiocyanatobenzene, 1,3-diisothiocyanatobenzene, 1,4-diisothiocyanatobenzene, 2,4-diisothiocyanatotoluene, 2,5-diisothiocyanato-m-xylene, 4,4'-methylene-bis(phenyl isothiocyanate), 4,4'-methylene-bis(2-methylphenyl isothiocyanate), 4,4'-methylene-bis(3-methylphenyl isothiocyanate), 4,4'-diisothiocyanatobenzophenone, 4,4'-diisothiocyanato-3,3'-dimethylbenzophenone and bis(4-isothiocyanatophenyl) ether; an aliphatic polyisocyanate compound containing sulfur such as bis(isocyanatomethyl) sulfide, bis(isocyanatoethyl) sulfide, bis(isocyanatopropyl) sulfide, bis(isocyanatohexyl) sulfide, bis(isocyanatomethyl) sulfone, bis(isocyanatomethyl)disulfide, bis(isocyanatoethyl) disulfide, bis (isocyanatopropyl) disulfide, bis(isocyanatomethylthio) methane, bis(isocyanatoethylthio)methane, bis (isocyanatomethylthio)ethane, bis(isocyanatoethylthio) ethane, 1,5-diisocyanato-2-isocyanatomethyl-3-thiapentane, 1,2,3-tris(isocyanatomethylthio)propane, 1,2,3-tris(isocyanatoethylthio)propane, 3,5-dithia-1,2,6,7-heptane tetraisocyanate, 2,6-diisocyanatomethyl-3,5-dithia-1,7-heptane diisocyanate, 2,5-diisocyanate methyl thiophene, 4-iso cyanato ethylthio-2,6-dithia-1,8-octane diisocyanate, thiobis(3-isothiocyanatopropane), thiobis(2-isothiocyanatoethane), dithiobis(2-isothiocyanatoethane), 2,5-diisocyanatotetrahydrothiophene, 2,5-diisocyanatomethyltetrahydrothiophene, 3,4-diisocynatomethyltetrahydrothiophene, 2,5-diisocyanato-1, 4-dithiane, 2,5-diisocyanatomethyl-1,4-dithiane, 4,5-diisocyanato-1,3-dithiolane, 4,5-bis(isocyanatomethyl)-1,3-dithiolane and 4,5-diisocyanatomethyl-2-methyl-1,3-dithiolane; an aromatic sulfide-based polyisocyanate compound such as 2-isocyanatophenyl-4-isocyanatophenyl sulfide, bis(4-isocyanatophenyl) sulfide and bis(4-isocyanatomethylphenyl) sulfide; an aromatic disulfide-based polyisocyanate compound such as bis(4-isocyanatophenyl) disulfide, bis(2-methyl-5-isocyanatophenyl) disulfide, bis(3-methyl-5-isocyanatophenyl) disulfide, bis(3-methyl-6-isocyanatophenyl) disulfide, bis(4-methyl-5-isocyanatophenyl) disulfide, bis(4-methoxy-3-isocyanatophenyl) disulfide; a carbonyl polyisothiocyanate compound such as 1,3-benzenedicarbonyl diisothiocyanate, 1,4-benzenedicarbonyl diisothiocyanate and (2,2-pyridine)-4,4-dicarbonyl diisothiocyanate; an aromatic polyisothiocyanate compound containing sulfur such as 1-isothiocyanato-4-[(2-isothiocyanato)sulfonyl]benzene, thiobis(4-isothiocyanatobenzene), sulfonyl(4-isothiocyanatobenzene) and dithiobis(4-isothiocyanatobenzene); and a compound having an isocyanato group and an isothiocyanato group such as 1-isocyanato-6-isothiocyanatohexane, 1-isocyanato-4-isothiocyanatocyclohexane, 1-isocyanato-4-isothiocyanatobenzene, 4-methyl-3-isocyanato-1-isothiocyanatobenzene, 2-isocyanato-4,6-diisothiocyanato-1,3,5-triazine, 4-isocyanatophenyl-4-isothiocyanatophenyl sulfide and 2-isocyanatoethyl-2-isothiocyanatoethyl disulfide.

Specifically, examples of the polyiso(thio)cyanate compound may include an aliphatic polyisocyanate compound such as hexamethylene diisocyanate, 1,5-pentane diisocyanate, isophorone diisocyanate, bis(isocyanatomethyl)cyclohexane, dicyclohexylmethane diisocyanate, 2,5-bis(isocyanatomethyl)-bicyclo [2.2.1]heptane, 2,6-bis(isocyanatomethyl)-bicyclo [2.2.1] heptane, bis(4-isocyanatocyclohexyl)methane, 1,3-bis(isocyanatomethyl)cyclohexane and 1,4-bis(isocyanatomethyl)cyclohexane; and an aromatic polyisocyanate compound such as bis(isocyanatomethyl)benzene, m-xylene diisocyanate, bis(isocyanatomethyl cyclohexane), tolylene diisocyanate, 2,4-diisocyanatotoluene, 2,6-diisocyanatotoluene and 4,4'-methylene-bis(phenyl isocyanate).

In addition, it is also possible to use a halogen substituted form such as chlorine substituted form, a bromine substituted form, or the like, an alkyl substituted form, an alkoxy substituted form, a nitro substituted form, a prepolymer-type modified form with a polyhydric alcohol, a carbodiimide modified form, a urea modified form, a biuret modified form, or a dimerization or trimerization reaction product of the polyiso(thio)cyanate compound as described above. In such event, the above-exemplified compounds may be used alone or in combination of two or more thereof.

The bi- or higher functional thiol compound having at least one sulfide bond may be 4-mercaptomethyl-1,8-dimercapto-3,6-dithiooctane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, bis(mercaptoethyl) sulfide, 2,5-bis(mercaptomethyl)-1,4-dithiane, 1,1,3,3-tetrakis(mercaptomethylthio)propane, 4,6-bis(mercaptomethylthio)-1,3-dithiane, 2-(2,2-bis(mercaptomethylthio)ethyl)-1,3-dithiaethane, pentaerythritol tetrakis(3-mercaptopropionate), or a mixture thereof.

Specifically, it may be 4-mercaptomethyl-1,8-dimercapto-3,6-dithiooctane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, or a mixture thereof.

The bi- or higher functional thiol compound having at least one ester bond may be trimethylpropane tri(3-mercaptoacetate), trimethylpropane tri(3-mercaptopropionate), pentaerythritol tetrakis(2-mercaptoacetate), pentaerythritol tetrakis(3-mercaptopropionate), dipentaerythritol hexa(3-mercaptoacetate), dipentaerythritol hexa(3-mercaptopropionate), or a mixture thereof.

Specifically, it may be pentaerythritol tetrakis(3-mercaptoacetate), pentaerythritol tetrakis(2-mercaptopropionate), or a mixture thereof.

The catalyst may be a halogenated tin-based catalyst. For example, the halogenated tin-based catalyst may be selected from the group consisting of phenyltin trichloride, diphenyltin dichloride, triphenyltin chloride, tricyclohexyltin chloride, methyltin trichloride, dimethyltin dichloride, dibutyltin dichloride, trimethyltin chloride, butyltin trichloride, tributyltin chloride, di-tert-butyltin dichloride, butyltin chloride dihydroxide, tributyltin bromide, tributyltin iodide, trimethyltin bromide, triethyltin bromide, and a mixture thereof. Specifically, it may be dimethyltin dichloride, dibutyltin dichloride, or a mixture thereof.

The catalyst may be used in an amount of 0.001 to 0.5 part by weight, 0.005 to 0.1 part by weight, or 0.01 to 0.08 part by weight, based on the total weight of the polyiso(thio)cyanate compound and the thiol compound.

The polymerizable composition may further comprise a diketone compound. Since the activity of the halogenated catalyst can be controlled by a β-diketonate compound derived from the diketone compound during the polymerization, the polymerization rate and viscosity of the polymerizable composition can be controlled.

The diketone compound may be selected from the group consisting of acetylacetone, perfluoroacetylacetone, benzoyl-2-furanoylmethane, 1,3-bis(3-pyridyl)-1,3-propanedione, benzoyltrifluoroacetone, benzoylacetone, di(4-bromo)benzoylmethane, d,d-dicamphorylmethane, 4,4-dimethoxydibenzoylmethane, 2,6-dimethyl-3,5-heptanedione, dinaphthoylmethane, dipivaloylmethane, di(perfluoro-2-propoxypropionyl)methane, 1,3-di(2-thienyl)-1,3-propanedione, 3-(trifluoroacetyl)-d-camphor, 6,6,6-trifluoro-2,2-dimethyl-3,5-hexanedione, 1,1,1,2,2,6,6,7,7,7-decafluoro-3,5-heptanedione, 6,6,7,7,8,8,8-heptafluoro-2,2-dimethyl-3,5-octanedione, 2-furyltrifluoroacetone, hexafluoroacetylacetone, 3-(heptafluorobutyryl)-d-camphor, 4,4,5,5,6,6,6-heptafluoro-1-(2-thienyl)-1,3-hexanedione, 4-methylbenzoyl-2-furanoylmethane, 6-methyl-2,4-heptanedione, 2-naphthoyltrifluoroacetone, 3-(5-phenyl-1,3,4-oxadiazol-2-yl)-2,4-pentanedione, 3-phenyl-2,4-pentanedione, pivaloyltrifluoroacetone, 1-phenyl-3-(2-thienyl)-1,3-propanedione, 3-(tert-butylhydroxymethylene)-d-camphor, trifluoroacetylacetone, 1,1,1,2,2,3,3,7,7,8,8,9,9,9-tetradecafluoro-4,6-nonanedione, 2,2,6,6-tetramethyl-3,5-heptanedione, 4,4,4-trifluoro-1-(2-naphthyl)-1,3-butanedione, 2,2,6,6-tetramethyl-3,5-octanedione, 2,2,6-trimethyl-3,5-heptanedione, 2,2,7-trimethyl-3,5-octanedione, 2-thenoyltrifluoroacetone, and a mixture thereof. Specifically, it may be acetylacetone, perfluoroacetylacetone, benzoyl-2-furanoylmethane, or a mixture thereof. Acetylacetone is the most preferable in terms of the economic efficiency and effectiveness.

The diketone compound may be used in an amount of 5 to 150% by weight, specifically 10 to 90% by weight, based on the weight of the catalyst. It is desirable to increase the amount of the diketone compound if the reaction rate is faster.

The polymerizable composition may further comprise such additives as an internal mold release agent, a heat stabilizer, an ultraviolet absorber, and a blueing agent, depending on the purpose thereof.

The internal release agent may be selected from a fluorine-based nonionic surfactant having a perfluoroalkyl group, a hydroxyalkyl group, or a phosphate ester group; a silicone-based nonionic surfactant having a dimethylpolysiloxane group, a hydroxyalkyl group, or a phosphate ester group; an alkyl quaternary ammonium salt such as trimethylcetylammonium salt, trimethylstearylammonium salt, dimethylethylcetylammonium salt, triethyldodecylammonium salt, trioctylmethylammonium salt, and diethylcyclohexadodecylammonium salt; and an acidic phosphate ester. It may be used alone or in combination of two or more thereof.

As the heat stabilizer, a metal fatty acid salt, a phosphorus compound, a lead compound, or an organotin compound may be used alone or in combination of two or more thereof.

As the ultraviolet absorber, benzophenone, benzotriazole, salicylate, cyanoacrylate, oxanilide, or the like may be used.

The blueing agent has an absorption band in the wavelength range from orange to yellow in the visible light region and has a function of adjusting the color of an optical material made of a resin. Specifically, the blueing agent may comprise a material that exhibits blue to violet color, but is not particularly limited thereto. In addition, examples of the blueing agent include a dye, a fluorescent whitening agent, a fluorescent pigment, and an inorganic pigment. It may be properly selected in accordance with the properties required for an optical component to be produced and the resin color. The blueing agent may be used alone or in combination of two or more thereof.

In view of the solubility in the polymerizable composition and the transparency of the optical material to be produced, a dye is preferably used as the blueing agent. From the viewpoint of the absorption wavelength, the dye may particularly have a maximum absorption wavelength of 520 to 600 nm; and more particularly, a maximum absorption wavelength of 540 to 580 nm. In addition, in terms of the structure of the compound, an anthraquinone-based dye is preferable as the dye. The method of adding the blueing agent is not particularly limited, and the blueing agent may be added to the monomers in advance. Specifically, various methods can be used; for example, the blueing agent may be dissolved in the monomers or may be contained in a master solution in a high concentration, the master solution being later diluted with the monomers or other additives and then added.

In an embodiment, the polymerizable composition as described above may be preliminarily polymerized in a mold at a low temperature of 5 to 20° C. and then thermally cured to prepare a polythiourethane-based compound. Specifically, an embodiment provides a process for preparing a polythiourethane-based plastic lens, which comprises providing a polymerizable composition, which comprises a polyiso(thio)cyanate compound, a bi- or higher functional thiol compound having at least one sulfide bond or at least one ester bond, and a catalyst; preliminarily polymerizing the composition at a temperature of 5° C. to 20° C.; and curing the preliminarily polymerized composition, wherein the preliminary polymerization is carried out such that it satisfies the above Equation 1.

Further, an embodiment provides a plastic lens prepared by curing a polymerizable composition, which comprises a polyiso(thio)cyanate compound, a bi- or higher functional thiol compound having at least one sulfide bond or at least one ester bond, and a catalyst, and which satisfies the above Equation 1.

More specifically, the polymerizable composition is degassed under reduced pressures and then injected into a mold for molding a lens. Such degassing and mold injection may be carried out in a temperature range of, for example, 0 to 30° C. or 5 to 20° C. Once the composition is injected into the mold, preliminary polymerization is carried out under the same temperature condition (i.e., at a low temperature) to stabilize the polymerization rate. Specifically, the preliminary polymerization is carried out at a temperature of 0 to 30° C. or 5 to 20° C. for 1 to 20 hours, 1 to 15 hours, or 1 to 10 hours, so as to prevent a high reaction rate during the thermal curing, i.e., to prevent a convection phenomenon that may be caused by rapid curing and defective appearance of a lens such as striae generated by the convection phenomenon.

Upon the preliminary polymerization, polymerization is carried out by a conventional method. For example, the polymerization is usually carried out by gradually heating the composition from a low temperature to a high temperature. The polymerization temperature may be, for example, 20 to 150° C., particularly 25 to 120° C.

Then, the polythiourethane-based plastic lens is released from the mold.

The polythiourethane-based plastic lens may have various shapes by changing the mold used in the production. Specifically, it may be in the form of an eyeglass lens, a camera lens, or the like.

If required, the plastic lens may be subjected to physical or chemical treatment such as surface polishing, antistatic treatment, hard coat treatment, anti-reflection coat treatment, dyeing treatment, and dimming treatment for the purpose of imparting thereto anti-reflection, hardness, abrasion resistance, chemical resistance, anti-fogging, or fashionity.

As described above, the polymerizable composition for a plastic lens according to the embodiment further comprises the diketone compound for the purpose of controlling the strong activity of the halogenated tin-based catalyst. Further, the polymerizable composition is preliminarily polymerized at a low temperature of 5 to 20° C. for a certain period of time, specifically 1 to 20 hours. Since it is possible to stabilize the reaction rate of the composition and to properly control the viscosity of the composition, a more stable pot life is attained, thereby improving the workability. In addition, the generation of bubbles is prevented, thereby improving the transparency of the resin. Hence, the polymerizable composition can be advantageously used for fabricating various plastic lenses such as eyeglass lenses, camera lenses, and the like.

Hereinafter, the present invention is explained in detail by Examples. The following Examples are intended to further illustrate the present invention. But the scope of the present is not limited thereto only.

Example 1: Preparation of a Polymerizable Composition for a Plastic Lens 50.7 parts by weight of m-xylylene diisocyanate (XDI), 0.03 part by weight of dibutyltin dichloride as a polymerization catalyst, 0.02 part by weight of acetylacetone, and 0.1 part by weight of Zelec®UN (acidic alkyl phosphate mold release agent; Stepan Company) as an internal mold release agent were mixed and dissolved at 20° C. Added thereto was 49.3 parts by weight of a mixture of tetrafunctional polythiol compounds comprising 4,8-dimercaptomethyl-1,11-dimercapto-3,6,9-trithiaundecane, 4,7-dimercaptomethyl-1,11-dimercapto-3,6,9-trithiaundecane, and 5,7-dimercaptomethyl-1,11-dimercapto-3,6,9-trithiaundecane that had been prepared in accordance with Example 1 of Japanese Laid-open Patent Publication No. Hei 7-252207. They were uniformly mixed to obtain a polymerizable composition.

Examples 2 to 4 and Comparative Examples 1 to 3: Preparation of Polymerizable Compositions The same procedure as in Example 1 was carried out to obtain polymerizable compositions for a plastic lens, except that the kinds and amounts of the compounds were changed as shown in Table 1 below.

Test Example: Property Measurement

The properties of the polymerizable compositions prepared in Examples 1 to 4 and Comparative Examples 1 to 3 were measured in accordance with the methods as described below. The measurement results are shown in Table 1 below.

(1) Polymerization Rate

The changes in viscosity of the polymerizable compositions prepared in Examples 1 to 4 and Comparative Examples 1 to 3 each were measured at 10° C. using a non-contact viscometer (EMS-1000, Kyoto Electronics Manufacturing Co., Ltd.). The relationship was represented as the following Equation 1 and shown graphically in FIGS.

1 to 4, wherein the X axis refers to time, the Y axis refers to viscosity, and the Y axis is represented in logarithmic scale:

$$\Delta \ln Y = b \times \Delta X. \quad \text{[Equation 1]}$$

(2) Evaluation of Transparency (or Cloudiness)

(5) Evaluation of Extent of Reaction

Each of the lenses prepared in Item (2) above was analyzed by ATR-type FT-IR. If the characteristic peak of —NCO at 2,260 cm$^{-1}$ completely disappeared, the lens was evaluated as ○. If the peak did not disappear, it was evaluated as x.

TABLE 1

|  |  |  | Ex. 1 | Ex. 2 | Ex. 3 | Ex. 4 | C. Ex. 1 | C. Ex. 2 | C. Ex. 3 |
|---|---|---|---|---|---|---|---|---|---|
| Polymerizable composition (% by wt.) | m-XDI |  | 50.7 | 52 | 43.5 | 50.7 | 50.7 | 50.7 | 50.7 |
|  | Thiol compound | A-1 | 49.3 | — | — | 49.3 | 49.3 | 49.3 | 49.3 |
|  |  | A-2 | — | 48 | — | — | — | — | — |
|  |  | A-3 | — | — | 56.5 | — | — | — | — |
|  | Catalyst | DBTDC | 0.05 | 0.05 | 0.05 | 0.1 | 0.05 | — | 0.01 |
|  |  | Dibutyl triethylamine | — | — | — | — | — | 0.05 | — |
|  | Acetylacetone |  | 0.02 | 0.02 | 0.02 | 0.07 | — | 0.02 | — |
|  | Zelec ®UN |  | 0.1 | 0.1 | 0.1 | 0.1 | 0.1 | 0.1 | 0.1 |
| Result | Polymerization rate (b) |  | 0.19 | 0.18 | 0.21 | 0.22 | 0.38 | Not measurable | Not measurable |
|  | Transparency |  | ○ | ○ | ○ | ○ | x | x | x |
|  | Releasability |  | ○ | ○ | ○ | Δ | x | x | Δ |
|  | Bubble |  | S | S | A | B | C | C | B |
|  | Extent of reaction |  | ○ | ○ | ○ | x | x | x | x |

A-1: a mixture of tetrafunctional polythiol compounds comprising 4,8-dimercaptomethyl-1,11-dimercapto-3,6,9-trithiaundecane, 4,7-dimercaptomethyl-1,11-dimercapto-3,6,9-trithiaundecane, and 5,7-dimercaptomethyl-1,11-dimercapto-3,6,9-trithiaundecane
A-2: 4-mercaptomethyl-1,8-dimercapto-3,6-dithiaoctane
A-3: pentaerythritol tetrakis(3-mercaptopropionate)
DBTDC: dibutyltin dichloride Each of the polymerizable compositions prepared in Examples 1 to 4 and Comparative Examples 1 to 3 was degassed at 10° C. under a reduced pressure of 600 Pa for 1 hour and then filtered through a Teflon filter of 3 μm. The polymerizable composition thus filtered was injected into a glass mold assembled by tapes. The mold was stabilized at 10° C. for five hours and then heated from 25° C. to 120° C. at a rate of 5° C./min, so that the polymerization was carried out at 120° C. for 18 hours. Then, the cured resin in the glass mold was further cured at 130° C. for 4 hours, and the molded article (i.e., a plastic lens) was released from the glass mold. The lens thus produced was evaluated for transparency by checking whether or not it was cloudy, as follows. Specifically, the lens was irradiated to a projector in a darkroom to visually observe whether the lens was cloudy or had any opaque material. If the lens neither was cloudy nor had any opaque material, it was evaluated as ○ (not cloudy). If it was cloudy or had any opaque material, it was evaluated as x (cloudy).

(3) Evaluation of Mold Releasability

The same method as in Item (2) above was used for the evaluation of mold releasability with a convex-type casting mold that had been assembled with glass molds having an outer diameter of 84 mm and a height of 17 mm and an outer diameter of 84 mm and a height of 11 mm, respectively, and tapes. 10 injections were carried out for the evaluation of each composition. Upon completion of the polymerization, the mold stood to be cooled to room temperature. If no mold was broken or cracked, it was evaluated as ○. If one or two molds were broken or cracked, it was evaluated as Δ. If three or more molds were broken or cracked, it was evaluated as x.

(4) Evaluation of Bubble Generation

Each of the lenses prepared in Item (2) above was observed with a microscope at a magnification of 100 times. If the number of bubbles was 0 in the inside, the lens was evaluated as S. If the number was 1 to 10, it was evaluated as A. If the number was 11 to 30, it was evaluated as B. If the number was 31 or more, it was evaluated as C.

As shown in Table 1 above, the compositions of Examples 1 to 4 were overall improved in terms of the polymerization rate, transparency, releasability, bubble generation, extent of reaction, and the like, as compared with the compositions of Comparative Examples 1 to 3. Accordingly, it is expected that the lenses produced in the Examples can be advantageously used because they have improved workability and are highly transparent.

The invention claimed is:

1. A polymerizable composition, which comprises a polyiso(thio)cyanate compound;
   a bi- or higher functional thiol compound having at least one sulfide bond or at least one ester bond;
   a halogenated tin-based catalyst, and
   a diketone compound in an amount of 5 to 150% by weight based on the weight of the catalyst, which satisfies the following Equation 1:

$$\Delta \ln Y = b \times \Delta X \quad \text{[Equation 1]}$$

wherein $\Delta \ln Y$ is $\ln Y_X - \ln Y_0$,
   $Y_0$ is the initial viscosity (cps) of the polymerizable composition,
   $Y_X$ is the viscosity (cps) of the polymerizable composition at a temperature of 10° C. after X hour(s) elapse,
   $\Delta X$ is from 1 hour to 10 hours, and
   b is the slope of a graph derived from the value of $\Delta \ln Y$ measured with respect to X time and is 0.1 hour$^{-1}$ to 0.3 hour$^{-1}$.

2. The polymerizable composition of claim 1, which has an initial viscosity of 20 to 100 cps at 10° C.

3. The polymerizable composition of claim 1, wherein the halogenated tin-based catalyst is used in an amount of 0.001 to 0.5 part by weight based on the total weight of the polyiso(thio)cyanate compound and the thiol compound.

4. The polymerizable composition of claim 1, wherein the halogenated tin-based catalyst is selected from the group consisting of phenyltin trichloride, diphenyltin dichloride, triphenyltin chloride, tricyclohexyltin chloride, methyltin trichloride, dimethyltin dichloride, dibutyltin dichloride, trimethyltin chloride, butyltin trichloride, tributyltin chloride, di-tert-butyltin dichloride, butyltin chloride dihydroxide, tributyltin bromide, tributyltin iodide, trimethyltin bromide, triethyltin bromide, and a mixture thereof.

5. The polymerizable composition of claim 1, wherein the diketone compound is selected from the group consisting of acetylacetone, perfluoroacetylacetone, benzoyl-2-furanoylmethane, 1,3-bis(3-pyridyl)-1,3-propanedione, benzoyltrifluoroacetone, benzoylacetone, di(4-bromo)benzoylmethane, d,d-dicamphorylmethane, 4,4-dimethoxydibenzoylmethane, 2,6-dimethyl-3,5-heptanedione, dinaphthoylmethane, dipivaloylmethane, di(perfluoro-2-propoxypropionyl)methane, 1,3-di(2-thienyl)-1,3-propanedione, 3-(trifluoroacetyl)-d-camphor, 6,6,6-trifluoro-2,2-dimethyl-3,5-hexanedione, 1,1,1,2,2,6,6,7,7,7-decafluoro-3,5-heptanedione, 6,6,7,7,8,8,8-heptafluoro-2,2-dimethyl-3,5-octanedione, 2-furyltrifluoroacetone, hexafluoroacetylacetone, 3-(heptafluorobutyryl)-d-camphor, 4,4,5,5,6,6,6-heptafluoro-1-(2-thienyl)-1,3-hexanedione, 4-methylbenzoyl-2-furanoylmethane, 6-methyl-2,4-heptanedione, 2-naphthoyltrifluoroacetone, 3-(5-phenyl-1,3,4-oxadiazol-2-yl)-2,4-pentanedione, 3-phenyl-2,4-pentanedione, pivaloyltrifluoroacetone, 1-phenyl-3-(2-thienyl)-1,3-propanedione, 3-(tert-butylhydroxymethylene)-d-camphor, trifluoroacetylacetone, 1,1,1,2,2,3,3,7,7,8,8,9,9,9-tetradecafluoro-4,6-nonanedione, 2,2,6,6-tetramethyl-3,5-heptanedione, 4,4,4-trifluoro-1-(2-naphthyl)-1,3-butanedione, 2,2,6,6-tetramethyl-3,5-octanedione, 2,2,6-trimethyl-3,5-heptanedione, 2,2,7-trimethyl-3,5-octanedione, 2-thenoyltrifluoroacetone, and a mixture thereof.

6. A process for preparing a polythiourethane-based plastic lens, the process comprising:
providing a polymerizable composition for a plastic lens, which comprises a polyiso(thio)cyanate compound; a bi- or higher functional thiol compound having at least one sulfide bond or at least one ester bond, a halogenated tin-based catalyst, and a diketone compound in an amount of 5 to 150% by weight based on the weight of the catalyst;
preliminarily polymerizing the composition at a temperature of 5° C. to 20° C.; and
curing the preliminarily polymerized composition,
wherein the preliminary polymerization is carried out such that it satisfies the following Equation 1:

$$\Delta \ln Y = b \times \Delta X \quad \text{[Equation 1]}$$

wherein $\Delta \ln Y$ is $\ln Y_X - \ln Y_0$,
$Y_0$ is the initial viscosity (cps) of the polymerizable composition,
$Y_X$ is the viscosity (cps) of the polymerizable composition at a temperature of 10° C. after X hour(s) elapse,
$\Delta X$ is from 1 hour to 10 hours, and
b is the slope of a graph derived from the value of $\Delta \ln Y$ measured with respect to X time and is 0.1 hour$^{-1}$ to 0.3 hour$^{-1}$.

7. A plastic lens prepared by curing a polymerizable composition, which comprises a polyiso(thio)cyanate compound; a bi- or higher functional thiol compound having at least one sulfide bond or at least one ester bond; a halogenated tin-based catalyst and a diketone compound in an amount of 5 to 150% by weight based on the weight of the catalyst, and which satisfies the following Equation 1:

$$\Delta \ln Y = b \times \Delta X \quad \text{[Equation 1]}$$

wherein $\Delta \ln Y$ is $\ln Y_X - \ln Y_0$,
$Y_0$ is the initial viscosity (cps) of the polymerizable composition,
$Y_X$ is the viscosity (cps) of the polymerizable composition at a temperature of 10° C. after X hour(s) elapse,
$\Delta X$ is from 1 hour to 10 hours, and
b is the slope of a graph derived from the value of $\Delta \ln Y$ measured with respect to X time and is 0.1 hour$^{-1}$ to 0.3 hour$^{-1}$.

* * * * *